US010522004B2

(12) United States Patent
Bennett

(10) Patent No.: US 10,522,004 B2
(45) Date of Patent: Dec. 31, 2019

(54) COMPUTER SYSTEM BASED GAMING DEVICE, SYSTEM AND METHOD

(71) Applicant: Aristocrat Technologies Australia Pty Limited, North Ryde, NSW (AU)

(72) Inventor: Nicholas Bennett, Manly Vale (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 377 days.

(21) Appl. No.: 15/232,573

(22) Filed: Aug. 9, 2016

(65) Prior Publication Data

US 2017/0046921 A1 Feb. 16, 2017

(30) Foreign Application Priority Data

Aug. 10, 2015 (AU) ................................ 2015903189

(51) Int. Cl.

*A63F 9/24* (2006.01)
*A63F 13/00* (2014.01)
*G06F 17/00* (2019.01)
*G06F 19/00* (2018.01)
*G07F 17/32* (2006.01)

(52) U.S. Cl.

CPC ...... *G07F 17/3262* (2013.01); *G07F 17/3209* (2013.01); *G07F 17/3211* (2013.01); *G07F 17/3225* (2013.01); *G07F 17/3241* (2013.01); *G07F 17/3246* (2013.01); *G07F 17/3251* (2013.01)

(58) Field of Classification Search

CPC ......................... G07F 17/3239; G07F 17/3281
See application file for complete search history.

(56) References Cited

U.S. PATENT DOCUMENTS

| | | | |
|---|---|---|---|
| 8,365,076 | B2 | 1/2013 | Hamilton, II et al. |
| 8,628,422 | B2 | 1/2014 | Allen et al. |
| 8,790,175 | B2 | 7/2014 | Aoki et al. |
| 9,192,860 | B2 | 11/2015 | Shuster |

(Continued)

OTHER PUBLICATIONS

AU Patent Examination Report in AU Application No. 2018214072, dated Jun. 27, 2019. 4 Pages.

(Continued)

*Primary Examiner* — Milap Shah
*Assistant Examiner* — Jason Pinheiro
(74) *Attorney, Agent, or Firm* — Armstrong Teasdale LLP

(57) ABSTRACT

A gaming system implements a method of gaming. The gaming system includes one or more gaming devices configured to enable a player to place a wager for play of a wagering game, and each gaming device includes a player tracking/marketing module (PTM). A plurality of avatars are selectable by a player, and after receiving one or more inputs from the player relating to the avatars selected and credit allocation for each selected avatar, one is designated as the active avatar for game play. The system receives, via a credit input mechanism, a credit wager to initiate play of a wagering game, and in response to a user input triggering game play via the gaming device, the PTM records credit wagered for game play against the active avatar. Moreover, in response to a winning outcome occurring in a game outcome for the triggered game play, the PTM records any award for the game outcome against one or more avatars in accordance with allocation criteria.

21 Claims, 7 Drawing Sheets

(56) References Cited

U.S. PATENT DOCUMENTS

| | | | | |
|---|---|---|---|---|
| 2006/0100019 | A1* | 5/2006 | Hornik .................... | G07F 17/32 463/42 |
| 2008/0300049 | A1 | 12/2008 | Anderson et al. | |
| 2011/0143834 | A1 | 6/2011 | Guinn et al. | |
| 2011/0244935 | A1* | 10/2011 | Matthews ........... | G07F 17/3295 463/9 |
| 2012/0157186 | A1 | 6/2012 | Chim | |
| 2014/0141866 | A1 | 5/2014 | Irwin, Jr. et al. | |
| 2014/0295952 | A1 | 10/2014 | Aoki et al. | |
| 2016/0074757 | A1 | 3/2016 | Shuster | |

OTHER PUBLICATIONS

AU Patent Examination Report in AU Application No. 2016210781, dated Aug. 9, 2017. 6 Pages.

* cited by examiner

COMPUTER SYSTEM BASED GAMING DEVICE, SYSTEM AND METHOD

CROSS-REFERENCE TO RELATED APPLICATIONS

This application claims the benefit of priority to Australian Provisional Patent Application No. 2015903189, filed Aug. 10, 2015, the entire contents and disclosure of which are hereby incorporated by reference in their entirety.

BACKGROUND

The present invention relates to computer system based gaming devices and systems, and more particular, to gaming systems having player tracking functionality.

It is known to provide a gaming system including a gaming controller arranged to randomly select symbols for display from a predetermined set of symbols and determine a game outcome based on the displayed symbols. Some systems also provide player tracking functionality to allow a player to utilize an account for allocating credit to use for game play and accumulating winnings.

While such gaming systems provide players with enjoyment, a need exists for alternative gaming systems in order to maintain or increase player enjoyment.

BRIEF DESCRIPTION

In one aspect, a method of gaming is implemented using a gaming system. The gaming system includes one or more gaming devices configured to enable a player to place a wager for play of a wagering game, and each gaming device includes a player tracking/marketing module (PTM). The method comprises providing via the PTM a plurality of avatars selectable by a player, determining by the PTM, after receiving one or more inputs from the player, one or more avatars selected and credit allocation for each selected avatar, and designating one of the selected avatars as an active avatar for game play. The method further comprises receiving, via the credit input mechanism, a credit wager to initiate play of a wagering game, in response to a user input triggering game play via the gaming device, recording by the PTM credit wagered for game play against the active avatar, and in response to a winning outcome occurring in a game outcome for the triggered game play via gaming device, recording, by the PTM, any award for the game outcome against one or more avatars in accordance with allocation criteria.

In another aspect, a gaming system is provided. The gaming system comprises at least one gaming device configured to enable a player to place a wager for play of a wagering game. Each gaming device includes a display configured to display a wagering game, and a player tracking/marketing module (PTM) configured to provide a plurality of avatars selectable by a player. Moreover, the PTM, in response to receiving one or more inputs indicating player selection and credit allocation for one or more avatars, for each selected avatar, is further configured to store avatar allocation data including a credit allocation for the avatar, and to allocate one of the selected avatars as an active avatar for game play. The PTM is also configured to monitor game play via said at least one gaming device, to record credit wagered for game play, in response to user input triggering game play, against the active avatar, and to record any award for a winning game outcome occurring in a game against at least one avatar in accordance with allocation criteria.

In a further aspect, a player marketing module is provided. The player marketing module includes an avatar tracking module and a game play monitor. The avatar tracking module is configured to provide a plurality of avatars selectable by a player. In addition, the avatar tracking module is also configured to receive one or more inputs indicating player selection and credit allocation for one or more avatars, for each selected avatar, store avatar allocation data including a credit allocation for each avatar; and allocate one of the selected avatars as an active avatar for game play. The a game play monitor is configured to monitor credit wagered and award for outcomes of game play on a game device associated with said player marketing module, wherein the avatar tracking module is further configured to, in response to a user input triggering game play via the gaming device, record credit wagered for game play against the active avatar, and to record any award for a winning game outcome occurring in a game against one or more avatars in accordance with allocation criteria.

BRIEF DESCRIPTION OF DRAWINGS

An exemplary embodiment of the invention will now be described with reference to the accompanying drawings in which.

DETAILED DESCRIPTION

Figure 1:
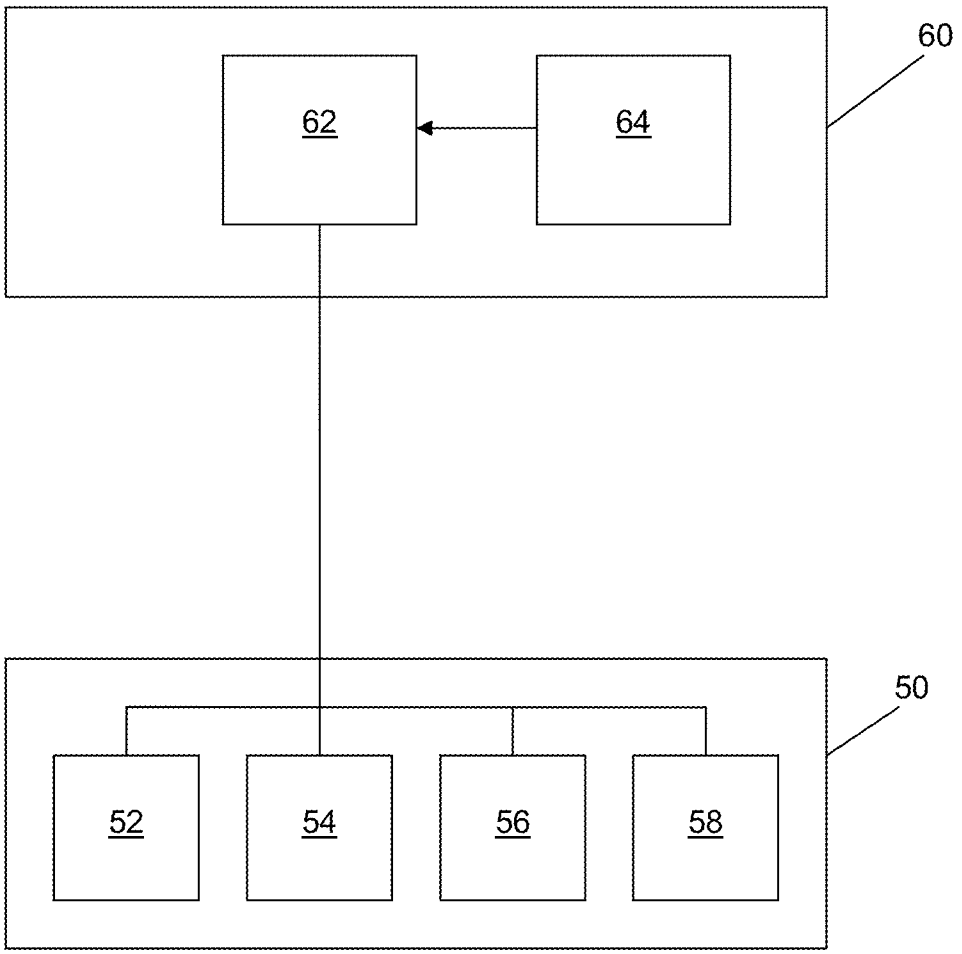
FIG. 1 is a block diagram of exemplary core components of a gaming system.

Referring to the drawings, there is shown a gaming system including one or more gaming devices each having a game controller arranged to implement a game and a player tracking/marketing module (PTM). The player tracking/marketing module (PTM) of each gaming device is configured to enable one or more player avatars to be allocated for game play, with credit allocated to each avatar. The avatar for game play is controlled via the PTM, whereby credit bet is allocated to the game for game play from the playing avatar credit, and wherein credit awards for the playing avatar are determined based on regular game outcomes generated by the game controller. An advantage of this arrangement is it facilitates multi-player style game play via a single player gaming device. For example, in the exemplary embodiment, a group of friends may cluster around a single gaming device and play the game together using their own avatars. The avatar selection, avatar credit allocation and award are each controlled via the PTM, independent of play of the game rules for regular game play.

General Construction of an Exemplary Gaming System

The gaming system can take a number of different forms. In a first aspect, a stand-alone gaming machine is provided wherein all or most components required for implementing the game are present in a player operable electronic gaming machine.

In a second aspect, a distributed architecture is provided wherein some of the components required for implementing the game are present in a player operable electronic gaming machine, also referred to as an interactive gaming terminal or gaming device, and at least some of the components required for implementing the game are located remotely from the gaming machine. For example, a "thick client" architecture may be used wherein part of the game is executed on a player operable gaming machine and part of the game is executed remotely, such as by a gaming server. Alternatively, "thin client" architecture may be used wherein most of the game is executed remotely from the gaming machine, such as by a gaming server and a player operable gaming device is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may selectively operate in stand-alone gaming machine mode, "thick client" mode or "thin client" mode depending on several factors, including, for example, the game being played, operating conditions, and/or other factors. Other variations will be apparent to persons skilled in the art.

FIG. 1 is a block diagram of exemplary core components of a gaming system 20. Irrespective of the form, gaming system 18 has several core components 21. At the broadest level, core components 22 include a player interface 50 and a game controller 60. Player interface 50 is arranged to enable manual interaction between a player and gaming system 18 and includes input/output components required for the player to enter instructions to play the game and to observe the game outcomes.

Components of player interface 50 may vary from embodiment to embodiment but will typically include at least credit mechanism 52 to enable a player to input credits and receive payouts, at least one display 54, a game play mechanism 56 including one or more input devices that enable a player to input game play instructions (e.g., to place a wager), and one or more speakers 58.

Game controller 60 is in data communication with the player interface 50 and typically includes a processor 62 that processes the game play instructions in accordance with game play rules and outputs game play outcomes to the display 54. Typically, the game play rules are stored as program code in a memory 64 but can also be hardwired. As used herein, the term "processor" refers generically to any device that can process game play instructions in accordance with game play rules and may include, for example, a microprocessor, microcontroller, programmable logic device or other computational device, a general purpose computer (e.g., a PC) or a server. That is, a processor 62 may be provided by any suitable logic circuitry for receiving inputs, processing them in accordance with instructions stored in memory 64 and generating outputs (for example on display 54). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
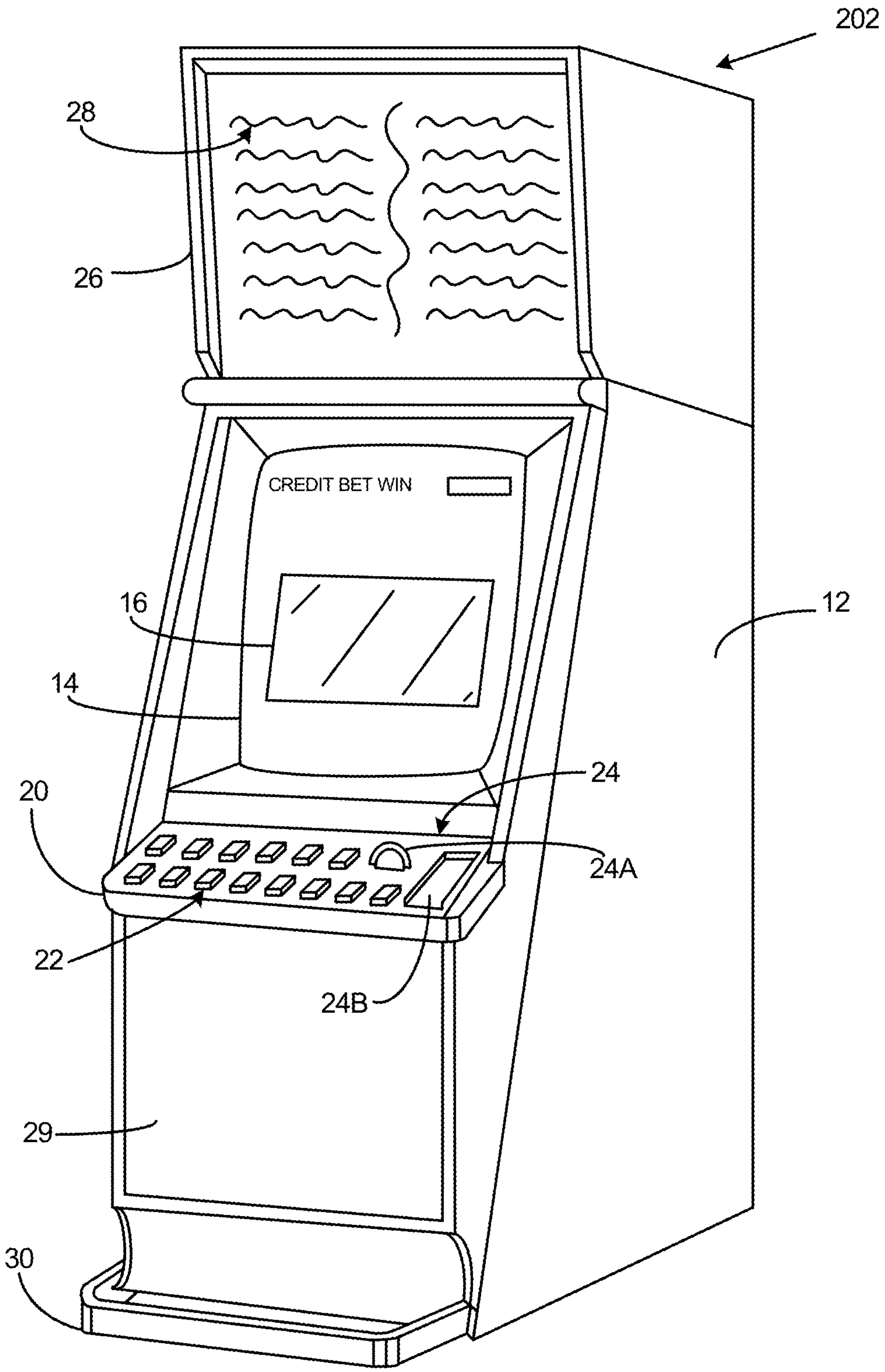
FIG. 2 is a perspective view of an exemplary stand alone gaming machine.

FIG. 2 illustrates a gaming system 18 in the form of an exemplary stand-alone gaming machine 202. In the exemplary embodiment, gaming machine 202 includes a console 12 having a display 14 on which are displayed representations of a game 16 that can be played by a player. A mid-trim 20 of gaming machine 202 houses a bank of buttons 22 for enabling a player to interact with gaming machine 202, in particular during game play. Mid-trim 20 also houses a credit input mechanism 24. In the exemplary embodiment, mechanism 24 includes a coin input chute 24A and a bill collector 24B. Other credit input mechanisms may also be employed, such as, for example, a card reader for reading a smart card, debit card or credit card. Other gaming machines may be configured for ticket use in that these gaming machines include a ticket reader for reading tickets having a value and for crediting the player based on the face value of the ticket.

A player marketing module (not shown) having a reading device may also be provided for the purpose of reading a player tracking device, for example as part of a loyalty program. The player tracking device may be in the form of a card, flash drive and/or any other portable storage medium capable of being read by the reading device. In some embodiments, the player marketing module may provide an additional credit mechanism, such as either by transferring credits to the gaming machine from credits stored on the player tracking device or by transferring credits from a player account in data communication with the player marketing module. The player marketing module may be integral with the gaming machine hardware. Alternatively, the player marketing module may also be implemented independent of the gaming machine. For example, the player marketing module may include a housing containing independent hardware and processing resources suitable for mounting to a gaming machine and including a communication interface to enable an exchange of data between the player marketing module and gaming machine. For example, the player marketing module may transmit to the gaming machine data regarding available player credit and may receive data regarding game outcomes and credit won. The communication interface may be a hardware communication port, or a wireless communication interface.

A top box 26 may carry artwork 28, including for example pay tables and details of bonus awards and other information or images relating to the game. Further artwork and/or information may be provided on a front panel 29 of console 12. In the exemplary embodiment, a payment mechanism such as coin tray 30 is mounted beneath front panel 29 for dispensing cash payouts from gaming machine 202.

In the exemplary embodiment, display 14 is a video display unit, particularly a cathode ray tube screen device. Alternatively, display 14 may be a liquid crystal display, plasma screen, any other suitable video display unit, or the visible portion of an electromechanical device. Top box 26 may also include a display, for example a video display unit, which may be of the same type as the display 14, or of a different type.

Figure 3:
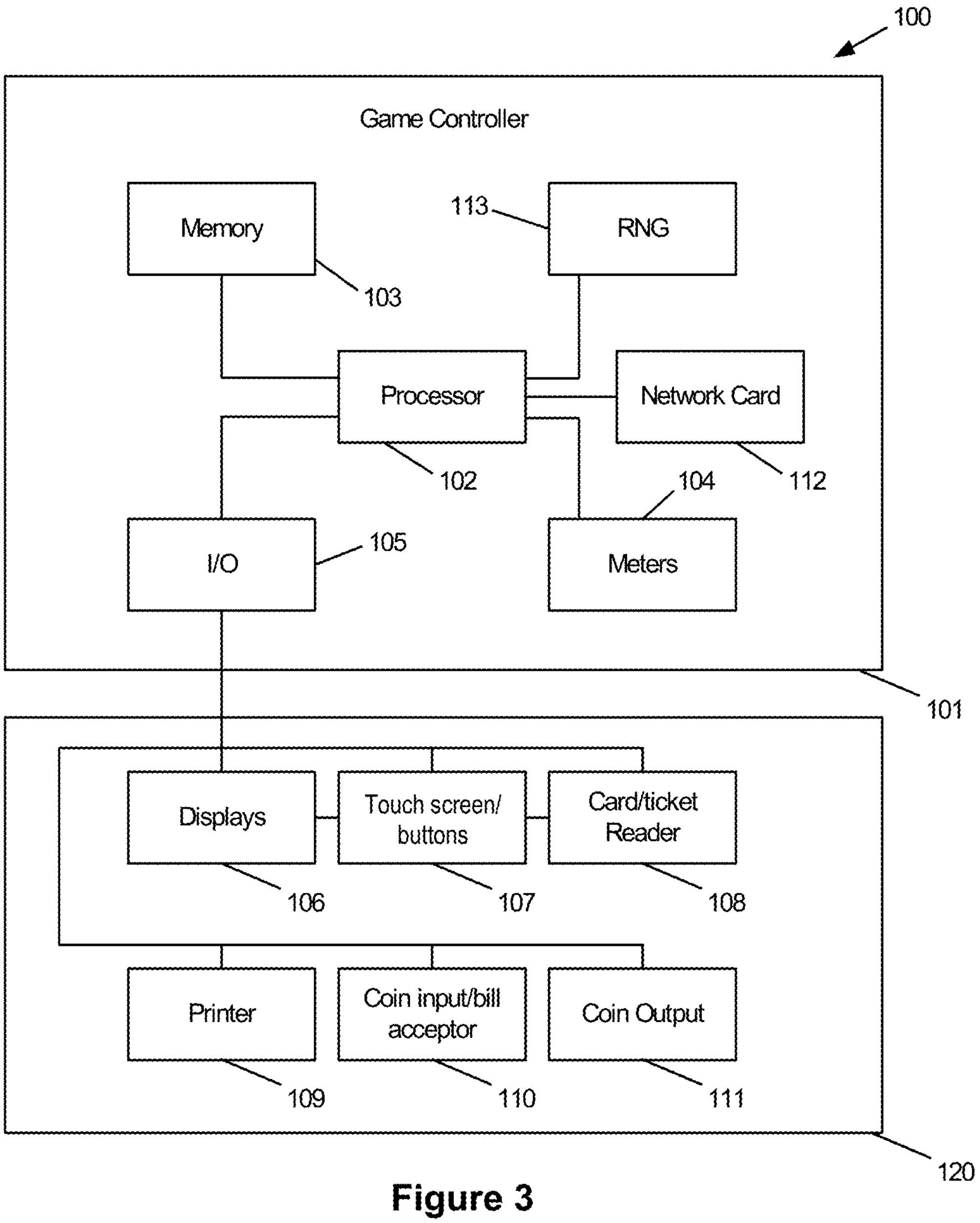
FIG. 3 is a block diagram of exemplary functional components of a gaming machine.

FIG. 3 illustrates a block diagram of exemplary functional components of a typical gaming machine 100 which may be the same as or different to gaming machine 202 of FIG. 2.

Gaming machine 100 includes a game controller 101 including a processor 102 mounted on a circuit board. Instructions and data to control operation of processor 102 are stored in a memory 103 that is in data communication with processor 102. Typically, gaming machine 100 will include both volatile and non-volatile memory and more than one of each type of memory, with such memories being collectively represented by memory 103.

Gaming machine 100 includes hardware meters 104 for purposes including ensuring regulatory compliance and monitoring player credit, an input/output (I/O) interface 105 for communicating with peripheral devices of gaming machine 100. Input/output interface 105 and/or the peripheral devices may be intelligent devices with their own memory for storing associated instructions and data for use with the input/output interface or the peripheral devices. A random number generator module 113 generates random numbers for use by processor 102. Persons skilled in the art will appreciate that the reference to random numbers includes pseudo-random numbers.

In the exemplary embodiment, a player interface 120 includes peripheral devices that communicate with game controller 101 including one or more displays 106, a touch screen and/or buttons 107 (which provide a game play mechanism), and a credit input mechanism, such as a card and/or ticket reader 108, a printer 109, a bill acceptor and/or coin input mechanism 110. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109. The payout mechanism is configured to output a payout to a player of gaming machine 100 based on an outcome of the game (e.g., a base game and/or a feature game).

Additional hardware may be included as part of gaming machine 100 or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen can display virtual buttons that a player can "press" by touching the screen where they are displayed.

In addition, gaming machine 100 may include a communications interface, for example a network card 112. Network card 112 may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of gaming machine 100. Communication via the player marketing module to a central controller may be additional to communication with a central controller via the gaming network.

Figure 4:
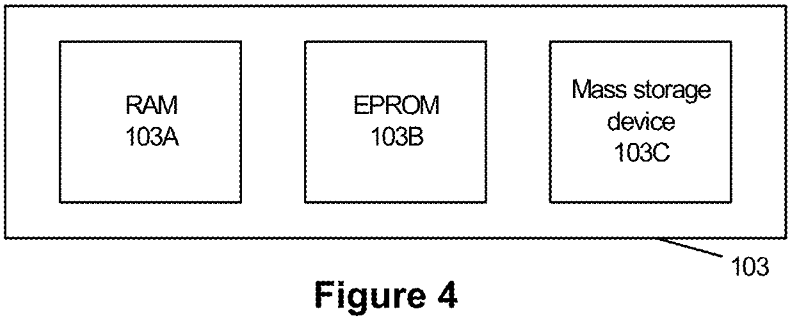
FIG. 4 is a schematic diagram of exemplary functional components of a memory.

FIG. 4 is an exemplary block diagram of the main components of memory 103. In the exemplary embodiment, memory 103 includes RAM 103A, EPROM 103B and a mass storage device 103C. RAM 103A typically temporarily holds program files for execution by processor 102 and related data. EPROM 103B may be a boot ROM device and/or may contain some system or game related code. Mass storage device 103C is typically used to store game programs, the integrity of which may be verified and/or authenticated by processor 102 using protected code from EPROM 103B or elsewhere.

It is also possible for the operative components of gaming machine 100 to be distributed. For example, in one embodiment, input/output devices 106,107,108,109,110,111 are provided remotely from game controller 101.

Figure 5:
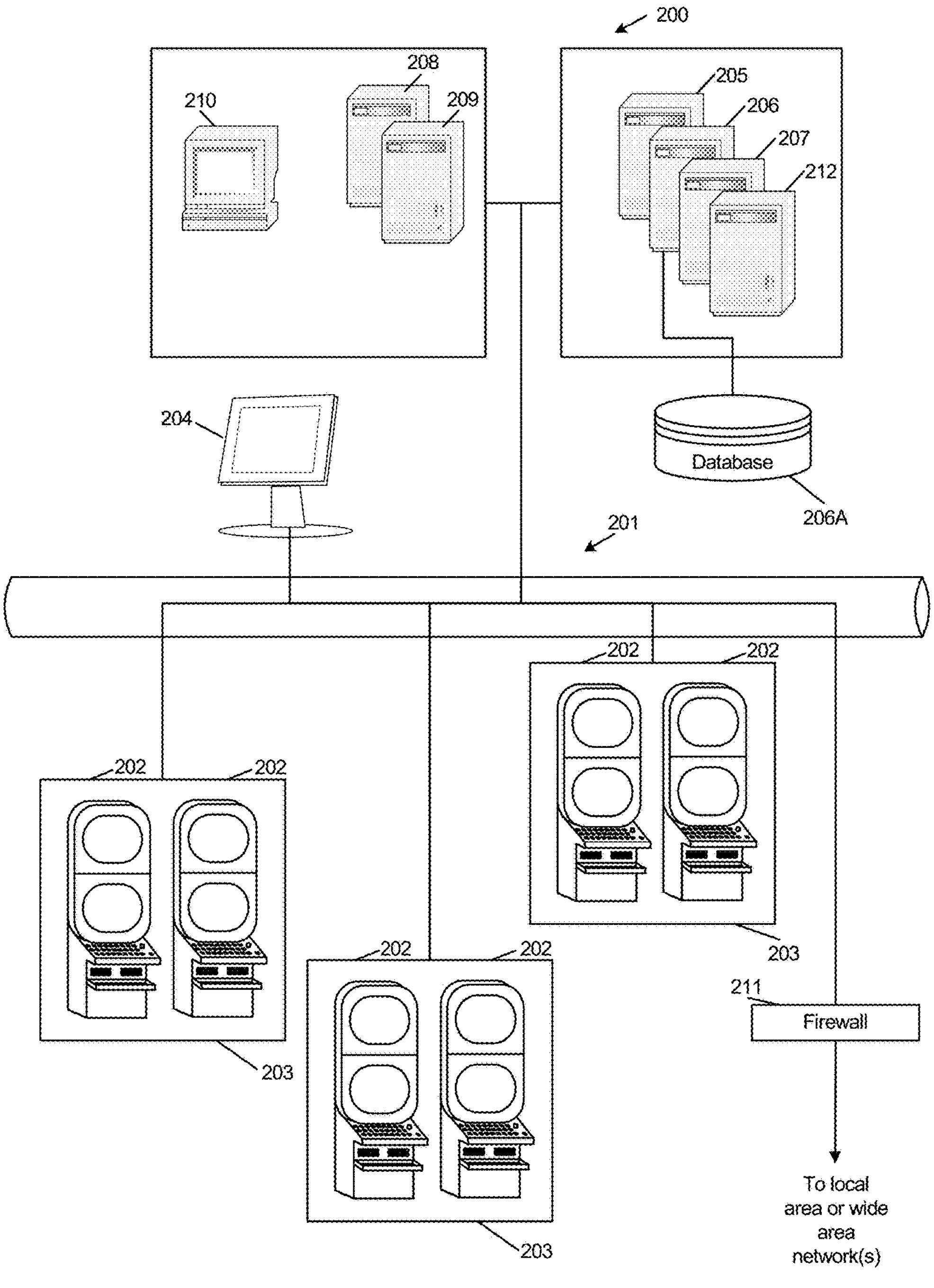
FIG. 5 is a schematic diagram of an exemplary functional components of a memory.

FIG. 5 illustrates an exemplary gaming system 200 in accordance with an alternative embodiment. Gaming system 200 includes a network 201, which for example may be an Ethernet network. In the exemplary embodiment, gaming machines 202, shown arranged in three banks 203 of two gaming machines 202 are coupled to network 201. Gaming machines 202 provide a player operable interface and may be the same as the gaming machines 292 and 100 shown in FIGS. 2 and 3, or may have simplified functionality depending on the requirements for implementing game play. Although banks 203 of two gaming machines 202 are shown, banks of one, three or more gaming machines are also envisioned.

One or more displays 204 may also be coupled to network 201. For example, displays 204 may be associated with one or more banks 203 of gaming machines 202. Displays 204 may be used to display representations associated with game play on gaming machines 202, and/or used to display other representations, for example promotional or informational material.

In a thick embodiment, a game server 205 implements part of the game played by a player using a gaming machine 202 and gaming machine 202 implements part of the game. With this embodiment, as both game server 205 and gaming machine 202 implement part of the game, they collectively provide a game controller. A database management server 206 may manage storage of game programs and associated data for downloading or access by the gaming machines 202 in a database 206A. Typically, if gaming system 200 enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using gaming machine 202 and gaming machine 202 essentially provides only the player interface. In such an embodiment, game server 205 provides the game controller and gaming machine 202 receives player instructions, and transmits these to game server 205. Server 205 processes them and return game play outcomes to gaming machine 202 for display. In a thin client embodiment, such gaming machines 202 could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of gaming system 200, including for example a gaming floor management server 208, and a licensing server 209 to monitor the use of licenses relating to particular games. An administrator terminal 210 is provided to allow an administrator to run the network 201 and the devices connected to network 201.

Gaming system 200 may communicate with other gaming systems, other local networks (for example a corporate network) and/or a wide area network such as the Internet, for example through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of the Exemplary Gaming System

In one embodiment, a gaming system is configured to operate with any type of gaming device and gaming system employing player tracking/marketing modules (PTM). Embodiments of the present invention provide additional player tracking features. In particular, in the exemplary embodiment, the gaming system enables players to choose one or more avatars, and their game play is associated with a selected avatar. The PTM may be connected to stand alone gaming devices or networked gaming devices.

In the exemplary embodiment, the PTM includes an avatar tracking module configured to provide a plurality of avatars selectable by a player. For example, data for a plurality of avatars, such as images, names, descriptions etc. can be stored in PTM memory or retrieved from a database via a gaming network, and displayed on a display for player selection. For example, a player may select an avatar via a touch screen or other input such as a button, joystick, keypad voice input etc. In the exemplary embodiment, when a player selects an avatar, avatar credit may also be assigned to the avatar. For example, in one embodiment, credits are assigned by inputting credit to the gaming machine (inserting coins or tokens). Alternatively, avatar credits may be assigned by assigning credit associated with a player tracking device to the avatar, such as, for example, by updating avatar data stored locally in the PTM memory with the credit assigned to the avatar, or by generating an avatar allocation table and populating the table with each selected avatar and credit allocation to each selected avatar.

In the exemplary embodiment, a player may input their player tracking card to a card reader on the PTM and in response the balance of credit associated with their account and a list or selection panel of avatars may be displayed to the player. When the player selects an avatar, they may assign a portion of their player credit to the avatar, such as, for example 50% or a set or fixed value, such as 300 credits. If more than one avatar is selected the PTM may automatically divide available credit between the avatars or assign credit in response to player input. Moreover, additional avatar data may be input, such as a wager credit value, and/or a maximum bet limit may also be assigned for use during game play. Data for each selected avatar 642, including a credit allocation for the avatar 642, is stored in PTM memory 640 for use and updating during game play.

For game play one of the selected avatars 642, is allocated as the active avatar. The active avatar may be displayed on PTM display 672. Data regarding the available player credit associated with the active avatar can also be input to the game controller 60 via PTM 670. In response to a user triggering game play via user interface 50, game play credit is deducted from the active avatar's credit allocation and applied to initiate game play. Game monitor 622 of PTM 670 detects the game play trigger and the avatar credit recorded in the PTM can be updated accordingly. In response to a winning outcome occurring, where an award is payable to the player, data regarding the award is received by the PTM and the award is recorded in the PTM as credit against the active avatar in accordance with avatar rules.

In one embodiment awards for winning outcomes may be divided amongst avatars. For example, in such an embodiment, a proportion of wining credit is allocated to the active avatar and proportions of remaining credit are allocated to other avatars (for example, 70% to the active avatar, 20% to a second avatar and 10% to a third avatar). Rules for award allocation may be pre-defined in PTM memory, selectable by players and/or defined by player input. For example, a player may define proportions of winnings to split across avatars via a key pad or other input interface. Alternatively, a player may pick a predefined credit split from a list of displayed options. In another embodiment, the credit split may be set as a rule stored in PTM memory, such as, for example a rule allocating 50% of winnings to the active avatar and dividing the remaining credit equally across other avatars. In each embodiment, rules may also include thresholds for dividing award credits. For example, the rules may award credits below a set threshold, for example, 100 credits, or may require that if a maximum wager threshold for a game round is not satisfied, award credits are not divided. The credit available for the next round of game play, communicated to the game controller by the PTM, can be updated based on the active avatar credit after each round of game play or after each winning outcome, as the credit award for the active avatar may not correspond to the total award for the outcome.

The active avatar may be changed in response to user input, such as, for example pushing a button or touch screen input. Alternatively the active avatar may be changed automatically by an avatar controller of the PTM. For example in one embodiment, the active avatar is changed based on avatar allocation rules, such as "change every 5 game rounds" or "change in response to a non-winning game outcome". Alternatively changing avatars may be based on a random process, such as a given symbol or sequence of symbols occurring in a game outcome. In another embodiment the PTM may provide an additional game to the player where avatars compete (under player or machine control) to become the next active avatar.

In the exemplary embodiment, several avatars can be selected, and optionally each avatar can also be associated with a different player. For example, a group of players; i.e., a circle of friends, may communally play a game on a gaming device, where each friend represented is by an avatar and each takes a turn to play the game. Winnings for each avatar are recorded separately, thus enabling the friends to track individual performance and to divide winnings at the end of game play. In one embodiment each avatar may be associated with a unique player ID linked to a player account, thus enabling avatar credit to be automatically allocated to the associated player account when a "pay-out" instruction is received. For example, in such an embodiment, the Avatar association data 645 can store a player identifier for each Avatar, and in response to a payout request, the PTM can then forward data to the player account server 610 specific to each player. Moreover, in such an embodiment, data forwarded may, for example, indicate the credit data (both total wagered and awarded) associated with each player. Forwarding data as such can also allow loyalty credits and other bonus awards or entitlements to be distributed to specific members of the group via the avatars. For example, specific players may become eligible for free parking, drink or meal vouchers after wagering a defined amount of credit during a given period, and such activity may be tracked based on the avatar associated with the player and the vouchers output to the player (via the gaming device or allocated to the player's account) once the eligibility criteria is met via an avatar associated with the player.

In one embodiment, loyalty credits and/or additional awards/entitlements are determined by the PTM for each Avatar based on eligibility rules stored in PTM memory 640. In another embodiment, the player account server may allocate loyalty credits and/or additional awards/entitlements based on the data transmitted by the PTM for each player.

The avatar feature may also be utilized by a player as a tool for use in managing their credit. For example, a player may select two avatars with credit awards to be divided evenly between the two avatars and select to have the active avatar only changed in response to user input. If the player then uses only one avatar during game play, 50% of the player's winning credits will accumulate with the second avatar and that avatar cannot be used for game play, unless the player inputs an avatar change instruction. Thus, the player can utilize an avatar to accumulate winning credits to "pocket" or cash out, rather than to re-play in a gaming machine.

Figure 6:
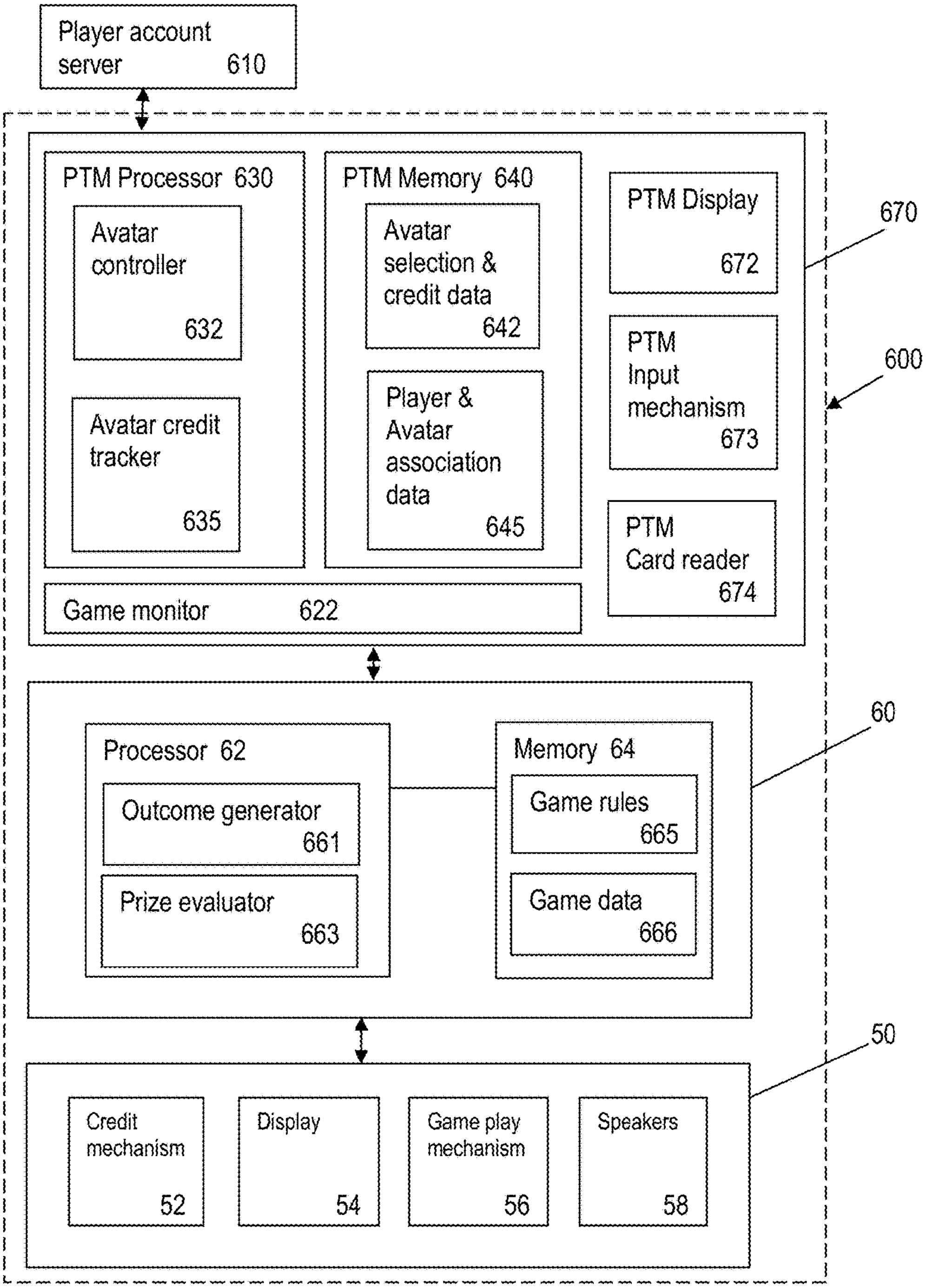
FIG. 6 is a further block diagram of an exemplary gaming system.

FIG. 6 illustrates an exemplary gaming device and player tracking module in accordance with one embodiment of the present invention, and in a block diagram. In the exemplary embodiment of FIG. 6, gaming device 600 is a stand-alone gaming device including a game controller 60 and a player interface 50 that provides all functionality required for play of a game, and a player tracking/marketing module 670. PTM 670 is in data communication with game controller 60 via a game monitor interface 622, to monitor player inputs for game play and game outcomes. PTM 670 is also in data communication with a player account server 610 via a gaming network.

PTM 670 also includes a processor 630 that implements an avatar controller 632 and an avatar credit tracker 635, a memory 640 that stores avatar data 642 and player/avatar association data 645, a display 672, a card (or other ID token or device) reader 674 and an input mechanism 673 (for example, a touch screen, key pad or buttons) that enables players to interact directly with PTM 670. In an alternative embodiment PTM 670 uses the gaming device player interface 50.

Figure 7:
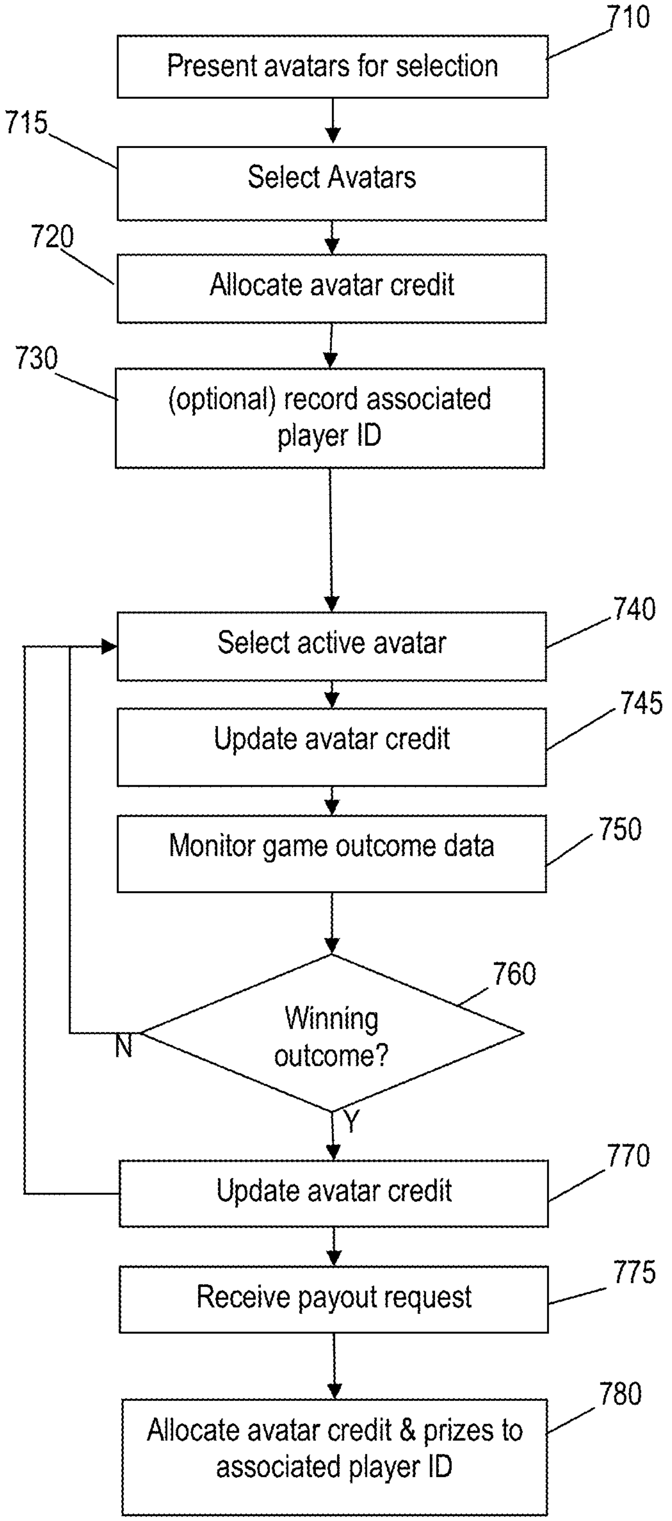
FIG. 7 is a flow chart of an exemplary method of electronic gaming.
Figure 8:
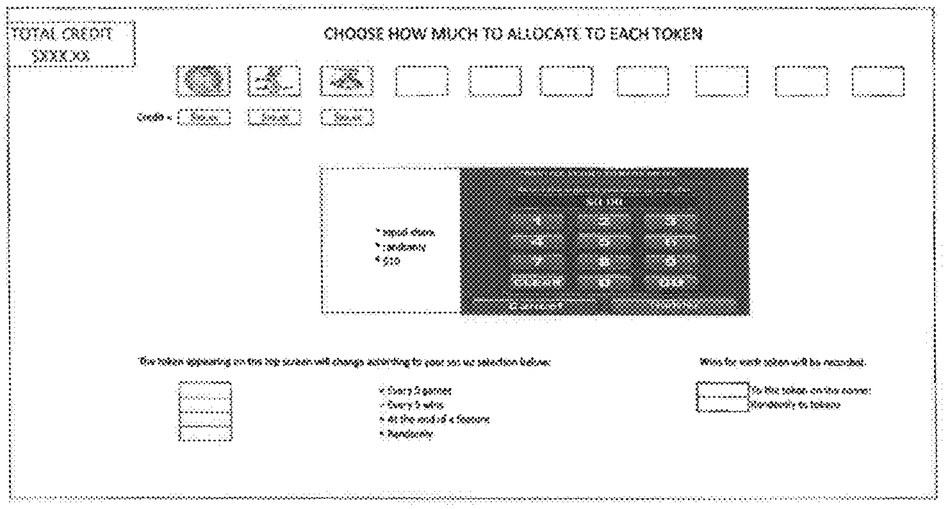
FIG. 8 is an exemplary PTM screen that may be used with the gaming machine of FIG. 2 or 3 and/or with the gaming system of FIG. 1, 5, or 6 for avatar selection and credit allocation.

FIG. 7 is a flow chart of an exemplary method of a game play process utilizing avatars. Initially, with reference to FIG. 6, credit is provided by the player, by, for example, entering a player tracking card in the reader 674 or inserting credit. In response to the credit input or the additional user input (for example, pushing an avatar button), avatar controller 632 is activated to retrieve and display avatar data 710 to enable avatars to be selected and credit to be allocated. The avatar data may be displayed in a PTM screen or in the gaming device display. FIG. 8 illustrates an exemplary PTM screen that may be used to enable avatar selection and credit input screen is shown in FIG. 8. It should be appreciated that different embodiments may use different display and input interfaces.

Player input is received to select the avatars for game play 715, and to allocate credit to each avatar 720. Optionally, each avatar may be associated with an individual player, for example by recording a player's name or a player identifier for each avatar. For example, names and identifiers may be input via a user interface or by reading each player's card or token via reader 674 as avatars are selected. Additional avatar data such as, for example, credit allocation directions and/or avatar changeover criteria, may also be specified. After the allocation is completed, a "finish" button may be provided to enable a player to indicate readiness for game play. If the game device display screen was used for avatar allocation, the game device display screen will revert to displaying game data ready for game play. Avatar data may then be displayed on the PTM display.

The avatar selected for use during game play, i.e., the active avatar, is selected 740 via the avatar controller 632. Such an avatar may be automatically selected 740, for example in accordance with defined rules or in response to a user input. For example, the selection of an active avatar may be based on precedence (i.e. the first selected, the highest credit allocation, via an alphabetical order by player or avatar name etc.), a defined order set by the players, or by a random process. After a random avatar selection process is used, the PTM may trigger the game controller to use its RNG 113 to generate a random or pseudo random result that is returned to the PTM to utilise for active avatar selection.

The selected avatar may be displayed on the PTM display screen using an image animation name or any combination thereof. Avatar data for each avatar may include one or more animations and sounds for different events such as, but not limited to:

(a) initial appearance/display
(b) certain size wins occur
(c) in a losing streak
(d) in a winning streak
(e) a feature triggered in the game
(f) a successful gamble
(g) an unsuccessful gamble
(h) having the most wins
(i) being replaced by another avatar
(j) when it is the winning avatar PTM 622 monitors game play, and in response to a user input triggering a game round, and applying a credit bet, the credit data for the active avatar is updated 745. For example, to deduct the credit bet from the avatar credit total stored in PTM memory 642 by the avatar credit tracker 635, PTM 622 may also record player tracking data, such as wagered credits for eligibility for player loyalty points and other entitlements, in player avatar association data 645.

Game play is executed in accordance with game controller 60 and game outcomes are monitored 750 by PTM 622. If a winning outcome occurs 760, the avatar credit tracker 635 updates avatar credit 770 in accordance with credit allocation rules. For example, if a winning outcome occurs 760, all credit won is awarded to the active avatar or is divided between avatars in accordance with defined allocation criteria. Game play will then continue, which may include selection of a new active avatar or use of the same active avatar for successive game play rounds. For example, avatar controller 632 may be configured to change the avatar in accordance with defined rules, such as:

(a) every 5 games
(b) every 10 games
(c) every 5 wins
(d) at the end of a feature\
(e) randomly within a given time period In one embodiment an additional game may be provided via the PTM to enable players to compete using their avatars for the next game round. For example, such a game may involve a game of skill, such as a memory, trivia or racing game, or chance such as a card draw or dice roll.

As games are played, information is recorded for each avatar. For example, information recorded may include:

(a) number of games played
(b) wins (c) number of features triggered
(d) feature wins
(e) gamble attempts
(f) gamble successes
(g) current credit amount
(h) total credit allocated to other avatars
(i) cumulative amount bet by avatar
(j) total time played by avatar In some embodiments, additional avatar features may be provided, such as, for example, avatars may "steal" credit for a win from another avatar. More specifically, the additional features may be triggered based on a characteristic of the game outcome, such as a symbol appearing during the game, or some other trigger event defined in the avatar rules. For example, in some embodiments, a time-based trigger monitored by the PTM, such as a specific time period between game rounds, may trigger a "steal" by another avatar, causing the credit for a winning outcome to be allocated to the "thief" avatar rather than to the active avatar. The "steal" could be decided before or during a game round.

Figure 9:
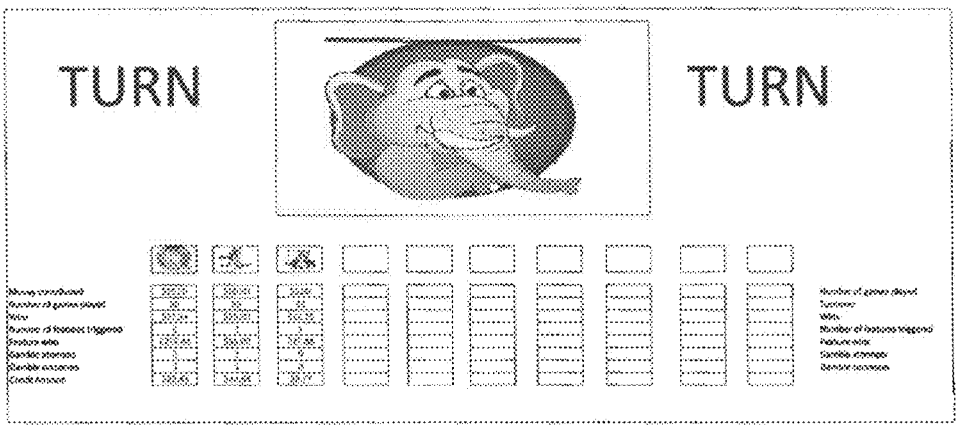
FIG. 9 is an exemplary PTM screen illustrating exemplary avatar tracking information.

Game play, using various avatars, will continue as described herein until a user input (typically indicated via the player interface at the player device) indicating a payout request 775 is detected. Such detection may trigger automatic payout of all credit allocated to different avatars 780 and end game play. Alternatively the payout request may trigger the display of an avatar record screen, for example, as shown in FIG. 9. FIG. 9 is an exemplary PTM screen including avatar game play data, and enabling a further action to be selected. Actions which may be executed in response to the input of a payout request include:

(a) payout of all credit to the player for each avatar;
(b) clearing from a previous setup and reallocation of avatar data (retaining user credit allocated for each user) to enable players to choose new avatars;
(c) entry of one or more new avatars (for example for new players joining play); and/or
(4) exit of one or more avatars (for example, one or more players leaving the group play).

When some avatars exit game play, PTM 622 can allocate avatar credit and any other prizes or entitlements to associated player accounts. If the avatars are not associated with different player accounts, avatar credit may be either payed out (for example, for manual handover to the player) or reallocated to the remaining avatars. The pay-out option may be predefined or selected via user input. Where a new avatar enters, credit may be newly input for the new avatar or reallocated from one or more other avatars. It should be appreciated that avatar credit handling and pay-out options may vary in different implementations.

Embodiments of avatar tracking can be used with any game and gaming machine functionality via the PTM. The PTM is configured to monitor game play and to attribute outcomes of game play to a selected avatar. Persons skilled in the art will appreciate that a player's win entitlement will vary from game to game. For example, the present invention may be used with spinning reel games, card game, roulette games etc.

Further, as the avatar tracking is implemented via the PTM, the avatar functionality does not impact the functioning and return to player (RTP) for the gaming device. Thus, the avatar functionality can be retrofitted to existing game devices and to existing gaming systems without requiring additional regulatory approval procedures for the game devices/systems. Thus, multi-player experiences can be enabled using the PTM for single player gaming devices.

The avatar tracking discussed above may also be utilised with linked gaming devices and multiplayer games, with players able to track game play via their avatars, and via communication between the PTMs via the gaming network. Embodiments may also enable players of linked gaming machines to compete via their avatars and to potentially "steal" winning outcomes from each other. Alternatively a group of friends playing different networked gaming devices may share credit wins from individual gaming devices via their avatars. For example, a player of one gaming device may allocate a proportion of credit for winning outcomes to an avatar linked to an account for a friend, who is playing a neighbouring gaming device and may be reciprocally allocated a proportion of winning credits from the other player. Such an arrangement may also be utilised to enable groups of players to donate portions of winning credits to a communal pool by using an avatar for the pool.

The player operates the game play mechanism 56 to specify the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and by selections they make (i.e. the nature of the wager). For example, a player's win entitlement may be based on how many lines they play in each game—e.g. a minimum of one line up to the maximum number of lines allowed by the game (noting that not all permutations of win lines may be available for selection). Such win lines are typically formed by a combination of symbol display positions, one from each reel, the symbol display positions being located relative to one another such that they form a line.

In many games, the player's win entitlement is not strictly limited to the lines they have selected. For example, in come embodiments, "scatter" pays may be awarded independently of a players selection of pay lines and as such, are an inherent part of the win entitlement.

Persons skilled in the art will appreciate that in other embodiments, the player may obtain a win entitlement by selecting a number of reels to play. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

In other embodiments a player win entitlement may be affected by purchasing access to particular pay tables—e.g. a first bet amount entitles the player to wins including cherries and a second amount entitles them to wins including plums. Depending on the specific implementation, the length of a play may be fixed (e.g. a single spin of reels of a spinning reel game) or variable (e.g. may include any free games awarded). Play ends when nothing further can occur to affect the outcome. In the prior art, such an action when credits resulting from any wins are transferred from the win meter to the credit meter.

In FIG. 6, the processor 62 of game controller 60 is shown implementing a number of modules based on program code and data stored in memory 64. Persons skilled in the art will appreciate that various of the modules could be implemented in some other way, for example by a dedicated circuit.

These modules include the outcome generator 661 which operates in response to the player's operation of game play mechanism 56 to place a wager and initiate a play of the game and generates a game outcome in accordance with game data 666 and game rules 665 which will then be evaluated by award evaluator 663, in accordance with game rules. For example, in a spinning reel game, the first part of forming the game outcome is for a symbol selector to select symbols from a set of symbols specified by symbol data using a random number generator. The selected symbols are advised to the display controller which causes them to be displayed on display 54 at a set of display positions.

One example of selecting symbols is for the symbol selector to select symbols for display from a plurality of symbol sets corresponding to respective ones of a plurality of spinning reels. The symbol sets, stored as game data 666, can specify a sequence of symbols for each reel such that the symbol selector can select all of the symbols by selecting a stopping position in the sequence. In one example, three symbols of each of five reels may be displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

Further aspects of the method will be apparent from the above description of the gaming system. Persons skilled in the art will also appreciate that the method could be embodied in program code. The program code could be supplied in a number of ways, for example on a computer readable medium, such as a disc or a memory (for example, that could replace part of memory 103) or as a data signal (for example, by transmitting it from a server).

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A method of gaming comprising:

displaying, by a player tracking/marketing module (PTM) of a gaming device, a plurality of avatars;

receiving, by the PTM, a player selection of at least two avatars of the plurality of avatars, the at least two avatars including a first player selected avatar and a second player selected avatar;

determining, by the PTM, after receiving the player selection, a credit allocation for each avatar of the at least two avatars, the credit allocation specifying a first percentage credit allocation for the first player selected avatar and a second percentage credit allocation for the second player selected avatar;

designating one of the at least two avatars as an active avatar for play of a wagering game at the gaming device;

receiving, via a credit input mechanism of the gaming device, a credit wager to initiate play of the wagering game;

recording, by the PTM, the credit wager against the active avatar; and in response to a winning outcome occurring as a result of the credit wager, recording, by the PTM, a first portion of an award associated with the winning outcome against the first player selected avatar in accordance with the first percentage credit allocation and a second portion of the award associated with the winning outcome against the second player selected avatar in accordance with the second percentage credit allocation.

2. The method of gaming as claimed in claim 1, wherein each player selected avatar is associated with a player identifier associated with a player account, said method further comprising applying the portion of the award recorded for the at least two avatars to an associated player account.

3. The method of gaming as claimed in claim 2, wherein the method further comprises designating the active avatar in response to a user input.

4. The method of gaming as claimed in claim 2, wherein the method further comprises designating the active avatar by the PTM in accordance with avatar rules.

5. The method of gaming as claimed in claim 4, further comprising changing the active avatar in response to an outcome of a random process.

6. The method of gaming as claimed in claim 2, wherein the method further comprises providing, by the PTM, an additional game, independent of the wagering game, wherein the at least two selected avatars compete against each other.

7. The method of gaming as claimed in claim 6, further comprising designating at least one of the active avatar and a credit allocation for the winning outcome, based on the competition of the avatars.

8. A gaming system comprising:

at least one gaming device configured to enable a player to place a wager for play of a wagering game, the at least one gaming device comprising:

a display configured to display a wagering game;

a credit input mechanism including at least one of a card reader, a ticket reader, a bill validator, or a coin input mechanism; and a player tracking/marketing module (PTM) comprising a processor configured to execute instructions stored in a memory, which, when executed by the processor, cause the processor to at least:

display a plurality of avatars;

receive a player selection of at least two avatars of the plurality of avatars, the at least two avatars including a first player selected avatar and a second player selected avatar;

determine, in response to receiving the player selection, a credit allocation for each avatar of the at least two avatars, the credit allocation specifying a first percentage credit allocation for the first player selected avatar and a second percentage credit allocation for the second player selected avatar;

designate one of the at least two avatars as an active avatar for play of the wagering game;

record a first portion of an award associated with a winning outcome occurring during the wagering game against the first player selected avatar in accordance with the first percentage credit allocation and a second portion of the award associated with the winning outcome against the second player selected avatar in accordance with the second percentage credit allocation.

9. The system as claimed in claim 8, wherein each player selected avatar is associated with a player identifier associated with a player account, whereby in response to a payout request, awards recorded for the at least two player selected avatars are applied to the associated player account.

10. The system as claimed in claim 9, wherein the instructions, when executed by the processor, further cause the processor to designate the active avatar in response to a user input.

11. The system as claimed in claim 9, wherein the instructions, when executed by the processor, further cause the processor to designate the active avatar in accordance with avatar rules.

12. The system as claimed in claim 11, wherein the instructions, when executed by the processor, further cause the processor to change the active avatar in response to an outcome of a random process.

13. The system as claimed in claim 9, wherein the instructions, when executed by the processor, further cause the processor to provide an additional game, independent of the wagering game, in which the player selected avatars compete against each other.

14. The system as claimed in claim 13 wherein the avatars compete to be designated as the active avatar or for allocation of the award.

15. A player tracking/marketing module (PTM) for use with a gaming device, the PTM comprising:

a tangible, non-transitory, computer-readable memory;

a processor configured to execute instructions stored on the memory, which, when executed by the processor, cause the processor to at least:

receive a player selection of at least two avatars of the plurality of avatars, the at least two avatars including a first player selected avatar and a second player selected avatar;

determine a credit allocation for each avatar of the at least two avatars, the credit allocation specifying a first percentage credit allocation for the first player selected avatar and a second percentage credit allocation for the second player selected avatar;

designate one of the at least two avatars as an active avatar for play of a wagering game on the gaming device; and record a first portion of an award associated with a winning game outcome occurring during the wagering game against the first player selected avatar in accordance with the first percentage credit allocation and a second portion of the award associated with the winning outcome against the second player selected avatar in accordance with the second percentage credit allocation.

16. The PTM as claimed in claim 15, wherein each player selected avatar is associated with a player identifier associated with a player account whereby in response to a payout request awards recorded for the at least two player selected avatars are applied to the associated player account.

17. The PTM of as claimed in claim 16, wherein the instructions, when executed by the processor, further cause the processor to designate the active avatar in response to a user input.

18. The PTM as claimed in claim 16, wherein the instructions, when executed by the processor, further cause the processor to designate the active avatar in accordance with pre-defined avatar rules.

19. The PTM as claimed in claim 18 wherein the instructions, when executed by the processor, further cause the processor to change the active avatar in response to an outcome of a random process.

20. The PTM as claimed in claim 16 wherein the instructions, when executed by the processor, further cause the processor to provide an additional game, independent of the wagering game, wherein the at least two selected avatars compete against each other.

21. The PTM as claimed in claim 20, wherein the player selected avatars compete to be designated as an active avatar or for allocation of the award.

* * * * *